No. 653,418.                                                                       Patented July 10, 1900.
W. R. JENNISON.
WATER COOLER.
(Application filed Nov. 16, 1899.)
(No Model.)                                                                         2 Sheets—Sheet 1.
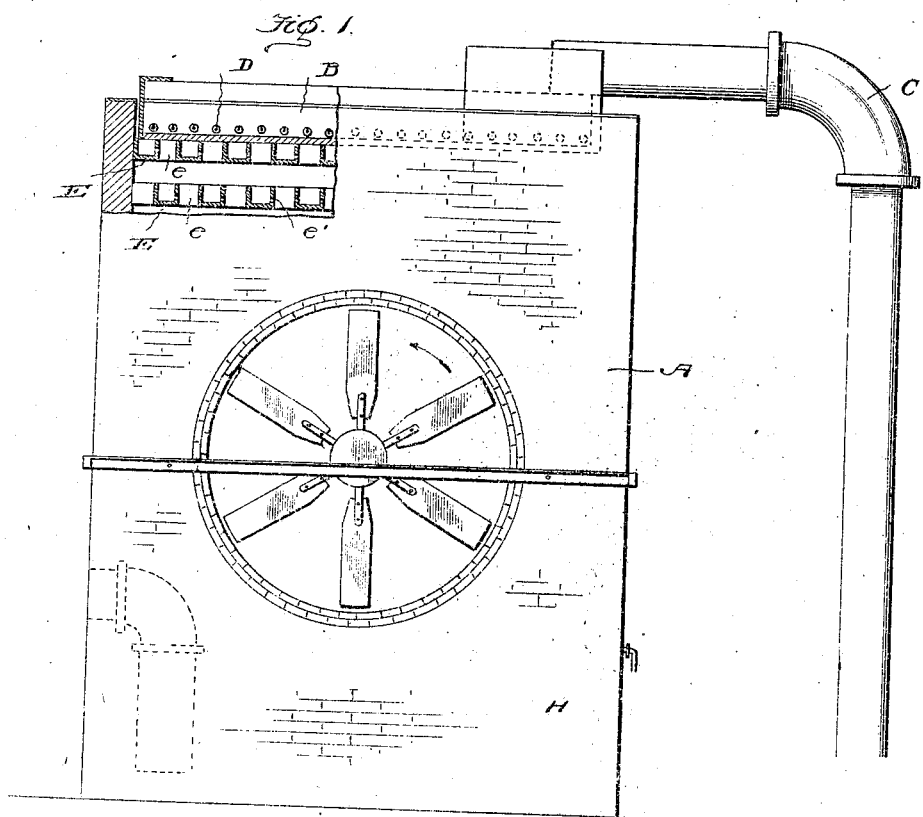
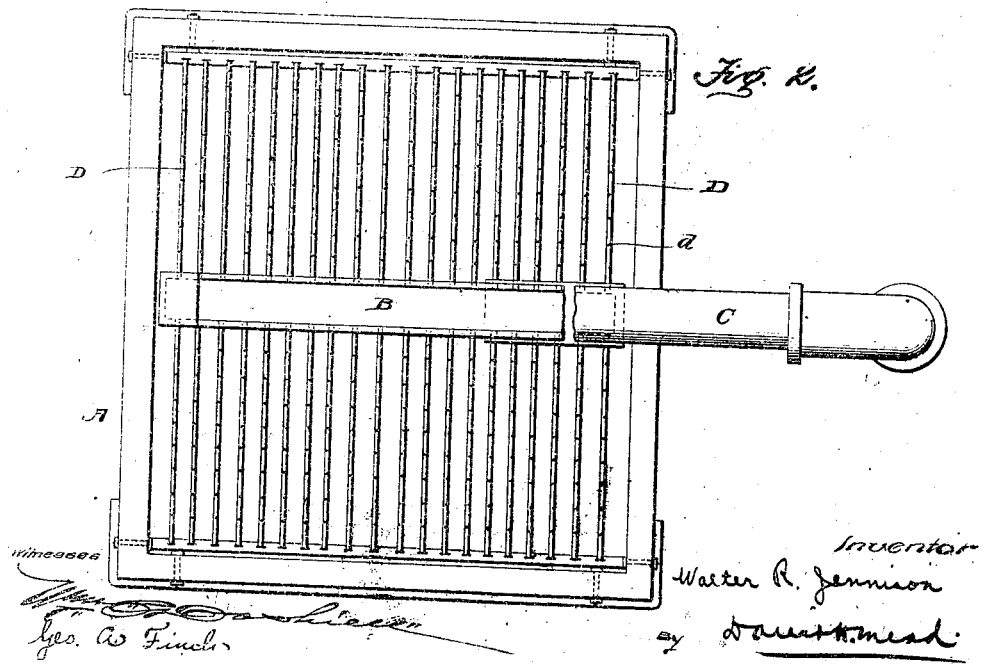

No. 653,418. Patented July 10, 1900.
W. R. JENNISON.
WATER COOLER.
(Application filed Nov. 16, 1899.)
(No Model.) 2 Sheets—Sheet 2.
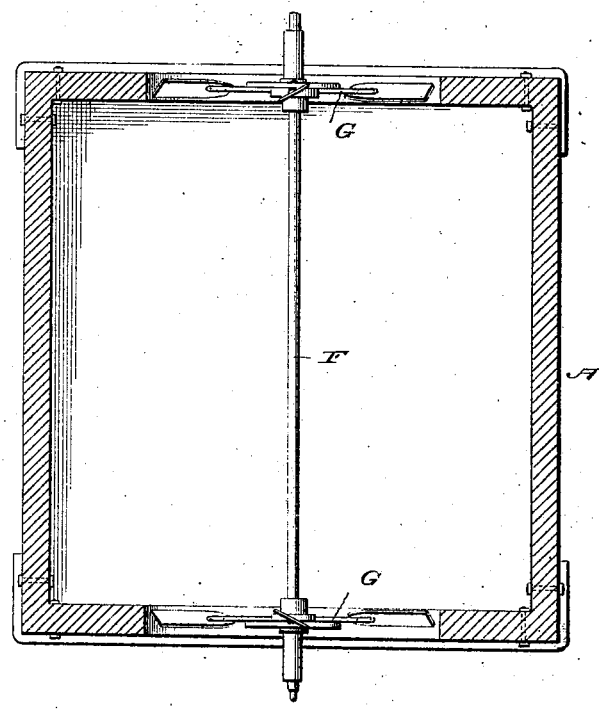
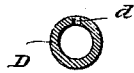
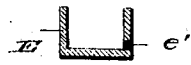
Witnesses: Inventor
Geo. W Finch Walter R. Jennison
By
Atty.

UNITED STATES PATENT OFFICE.

WALTER R. JENNISON, OF ATLANTA, GEORGIA.

WATER-COOLER.

SPECIFICATION forming part of Letters Patent No. 653,418, dated July 10, 1900.

Application filed November 16, 1899. Serial No. 737,221. (No model.)

*To all whom it may concern:*

Be it known that I, WALTER R. JENNISON, a citizen of the United States, residing at Atlanta, in the county of Fulton and State of Georgia, have invented certain new and useful Improvements in Water-Coolers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to liquid-coolers, and it relates particularly to that class thereof by which water of a comparatively-high temperature—such, for instance, as water of condensation from a steam-engine—is so treated as quickly to lower its temperature, adapting it for use in connection with triple or quadruple expansion engines or for other purposes where the use of water of a high temperature is impossible.

The object of the invention is to provide a simple means of cooling water, which means shall be easy and certain in operation and inexpensive in first cost and in cost of operation.

Further, the object of the invention is to provide means by which water of a relatively-high temperature shall without the employment of operatives in its manipulation be presented in globular form and by which all the globules are brought uniformly into contact with currents of air whereby a portion of the water is evaporated, with the result that the heat required for evaporation is taken from the remaining water, thereby causing the temperature of the latter to fall to a material extent.

Further, the invention consists of an apparatus for cooling water comprising a series of pipes having openings in the upper portions thereof, a tank or reservoir for supplying water to the pipes, a series of troughs having openings in the sides thereof and arranged below and in a position to receive water from the pipes, and a plurality of fans arranged below the troughs and adapted to cause currents of air to impinge against each other and to be brought into contact with water from the troughs.

Further, the invention consists of an apparatus for cooling water comprising a series of pipes having openings in their upper portions, a series of tiers of troughs arranged below the pipes, the troughs being arranged with spaces between them, the troughs and spaces of alternate tiers being so arranged that the troughs of one tier are over the spaces between the troughs of the next lower tier, and oppositely-arranged fans whereby currents of air are caused to impinge against each other and are brought into contact with water falling from the troughs.

The invention is illustrated in the accompanying drawings, in which—

Figure 1 is a side view of an apparatus constructed in accordance with my invention, the upper portion of the outer wall or casing of the apparatus being broken away in order to show the interior arrangement of water pipes and troughs. Fig. 2 is a plan view of the upper portion of the apparatus, showing the tank or reservoir and the discharge-pipes having perforated upper faces, the cover or roof of the apparatus being removed. Fig. 3 is a transverse section of the apparatus, the section being taken above the fan-shaft, showing the opposite inclination of the vanes of respective fans. Fig. 4 is a cross-section of one of the discharge-pipes. Fig. 5 is a cross-section of one of the troughs.

In the drawings, A represents the outer wall or casing of the apparatus, which may be of brick, stone, wood, or other suitable material of sufficient height to allow contact of water discharged at the top with air for a long enough period before reaching the bottom of the casing to become cool by such contact.

In the upper portion of the casing is arranged a tank or reservoir B, supplied with water from a suitable source by a pipe C. The tank or reservoir is preferably arranged, as shown particularly in Fig. 2 of the drawings, extending across the center of the casing. Projecting from the tank or reservoir, at right angles thereto and on both sides thereof, are the pipes D, having their open ends extending into a tank or reservoir, at the lower part thereof, and having their outer ends closed. These pipes D have along a portion of their upper surface a series of openings *d*.

Arranged below the pipes D and parallel to them are a series of tiers of troughs E, the number of tiers being regulated by the desired capacity of the cooler. The troughs of each tier are so arranged as to leave a space e between each adjacent trough, the space being of a width corresponding to the width of the troughs. The troughs of adjacent tiers are so arranged that the spaces between each trough is below the trough of the next higher tier. These troughs may be of any suitable material and are preferably of wood. They are each provided along one side near their bottoms with a series of small openings e'.

Arranged below the tiers of troughs E and extending transversely of the casing is a shaft F, mounted on suitable bearings in the walls of the wall or casing. Attached to this shaft, near the ends thereof, are the fans G. The vanes of the respective fans are oppositely arranged, so far as their inclination is concerned, so that by rotating the shaft in the direction indicated by the arrow in Fig. 1 in the drawings air is drawn in from outside each side of the casing and projected toward the center of the apparatus, with the result that the two currents of air impinge against each other and are thus diffused throughout the interior of the casing. The vanes are of the same size on the respective fans, so that an equal amount of air is projected by each and the force of the currents are the same. Openings are provided in the sides of the wall or casing adjacent to the fans to allow the latter to draw in air as the fans are rotated.

In the lower portion of the shaft or casing is a receiving-tank H, into which the water after coming in contact with the air is received.

While I have particularly described the use of only two fans, it will be understood that four or a greater even number of fans may be used, provided they are all arranged in a manner corresponding to that described.

In the operation of the apparatus water is introduced into the tank or reservoir B, and sufficient water is preferably supplied to keep the tank nearly filled during the operation of the apparatus. The water flows from the tank or reservoir into the pipes D, from which it is projected in drops or globules from the openings d in the upper portions of the pipes. The water in the described form drops into the troughs of the first or second tier, according to the pipe from which it is discharged. As the water accumulates in the troughs it drips therefrom through the small openings in the lower portions of the troughs, and by the described arrangement the water from each tier will drop into the troughs of the next adjacent tier below. The openings in the troughs being small the water is emitted in the form of drops. While the water is thus discharged in globular form from the pipes D and from one tier of troughs to another, it is brought into intimate contact with rapidly-moving currents of air supplied by the fans G, the arrangement of the fans, as described, insuring the diffusion of air uniformly throughout the shaft or casing in its ascent, thereby causing equal contact of air with the falling water in all parts of the apparatus.

The number of tiers of troughs may be multiplied indefinitely in order to give the desired capacity to the apparatus. The perfect contact of air with all the water treated is insured by causing the water to descend in the different stages in the form of drops or globules, thereby exposing to the air the greatest amount of surface. A small proportion of water treated as described is evaporated, and the heat necessary to effect the evaporation is drawn from the water which descends to the tank H, with the result that a great lowering in temperature is effected. I have found in the use of the apparatus when the temperature of the atmosphere is 60° Fahrenheit that water introduced into the tank or reservoir B at a temperature of 110° Fahrenheit will when it reaches the tank have its temperature lowered to approximately 52° Fahrenheit, and I attribute this great change accomplished in such a rapid manner to the facts that the water when presented to the air is in globular form and that the air is by the means described equally distributed throughout the casing through which the water falls.

Having thus described my invention, what I claim as new, and desire to secure by Letters Patent, is—

1. An apparatus for cooling water comprising a series of pipes having openings in their upper portions, a series of tiers of troughs arranged below the pipes, the troughs being arranged with spaces between them, the troughs and spaces of alternate tiers being so arranged that the troughs of one tier are over the spaces between the troughs of the next lower tier, and a plurality of oppositely-arranged fans whereby currents of air are caused to impinge against each other and are brought into contact with water falling from the troughs, substantially as described.

2. An apparatus for cooling water comprising a tank or reservoir, pipes attached to the lower portion of the tank or reservoir and extending therefrom, the pipes having their outer ends closed and being provided in their upper portion with a series of openings, a plurality of tiers of troughs parallel to the pipes and arranged below the same, each trough being provided near its lower end with openings and a shaft arranged below the troughs and provided with two fans, the fans being of equal size and having their vanes oppositely arranged, substantially as described.

In testimony whereof I affix my signature in presence of two witnesses.

WALTER R. JENNISON.

Witnesses:
 G. G. GLOWER,
 H. H. MORSE.